Nov. 16, 1965  P. S. MARTIN  3,217,694
FOWL WATERING APPARATUS
Filed Nov. 29, 1963  4 Sheets-Sheet 1

INVENTOR.
P. S. MARTIN
BY
ATT'Y.

Nov. 16, 1965   P. S. MARTIN   3,217,694
FOWL WATERING APPARATUS

Filed Nov. 29, 1963   4 Sheets-Sheet 2

INVENTOR.
P. S. MARTIN
BY
ATT'Y.

Nov. 16, 1965  P. S. MARTIN  3,217,694
FOWL WATERING APPARATUS
Filed Nov. 29, 1963  4 Sheets-Sheet 3

INVENTOR.
P. S. MARTIN
BY
ATT'Y.

United States Patent Office 3,217,694
Patented Nov. 16, 1965

3,217,694
FOWL WATERING APPARATUS
Perry S. Martin, P.O. Box 6, Harrisonburg, Va.
Filed Nov. 29, 1963, Ser. No. 326,715
7 Claims. (Cl. 119—79)

This invention relates to a fowl watering apparatus of the type disclosed in Patent No. 2,671,464.

One object of the invention is to produce an improved apparatus of the type set forth and an improved fowl watering system.

A further object is to produce an improved fowl watering apparatus which is fully automatic, sanitary, and readily adjustable for use by fowl of various sizes and ages.

A still further object is to produce an improved apparatus which automatically adds accurately measured quantities of any desired medicaton to water in a reservoir before the water is dispensed for use by the fowl.

A still further object is to produce an improved apparatus which operates at a relatively low and constant pressure whereby the reservoir may be built of light material; whereby light, thin and flexible tubing may be used for the laterals which connect the individual fountains with the reservoir; whereby high pressure induced leakage is eliminated, or reduced, without the use of expensive and complicated fittings, and whereby the water level in the fountains is maintained more easily and accurately than is possible when a high pressure system is used. The use of thin, flexible tubing as laterals makes possible easy adjustment of the height of the fountains according to the size of the fowl using one fountain or another. This height adjustment will be difficult and time consuming if the laterals were thick and/or rigid. The use of thin, flexible laterals also reduces the risk of breakage, should the laterals be twisted, stepped on, or otherwise strained.

Fowl drink by filling their beaks and elevating their heads to let the water run down their throats. This causes water to drip all around the fountain and creates a very unsanitary condition.

It is therefore a further object of the invention to produce a drinking fountain wherein the drippage referred to is eliminated, or is greatly reduced.

The full nature of the invention will be understood from the following specification and the accompanying drawings in which.

Figure 2:
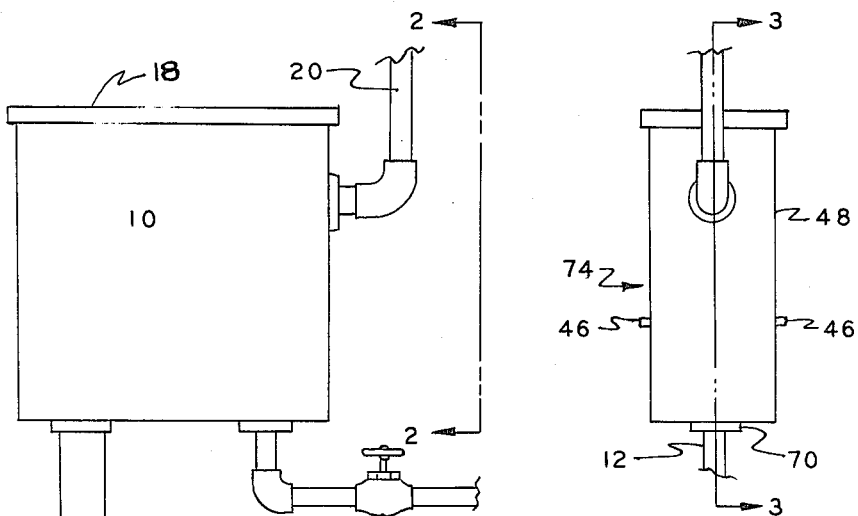
FIG. 2 is an end elevational view looking in the direction of line 2—2 on FIG. 1.
Figure 1:
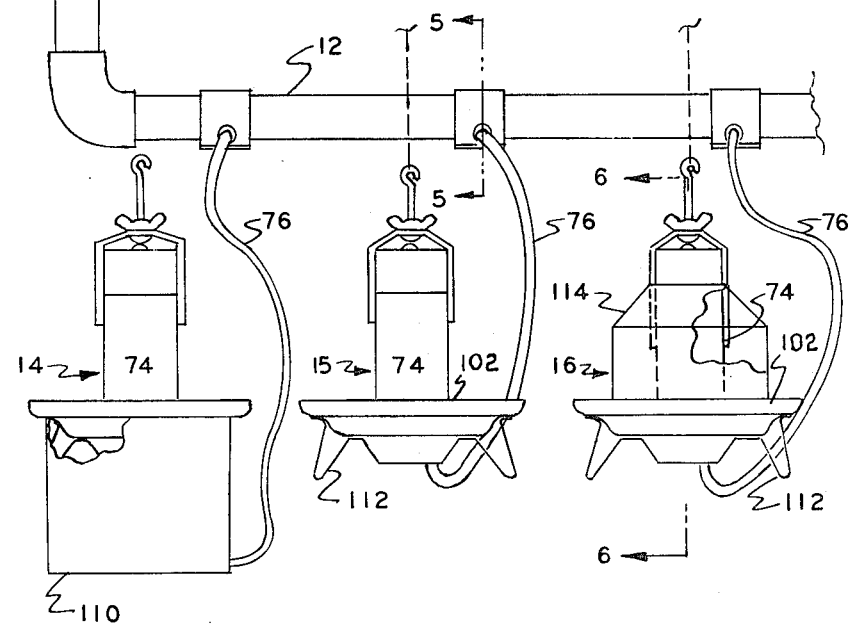
FIG. 1 is a diagrammatic side elevational view of a fowl watering system embodying my invention.

The system in general (FIG. 1)

Generally speaking, a fowl watering system embodying this invention includes a main reservoir 10 which discharges water into a feed pipe 12 which supplies individual fountains 14, 15, 16, etc., in the manner hereinafter set forth. The open top of tank 10 is closed by a cover 18 and it is provided with a vent, not shown, for maintaining atmospheric pressure within the tank.

Figure 3:
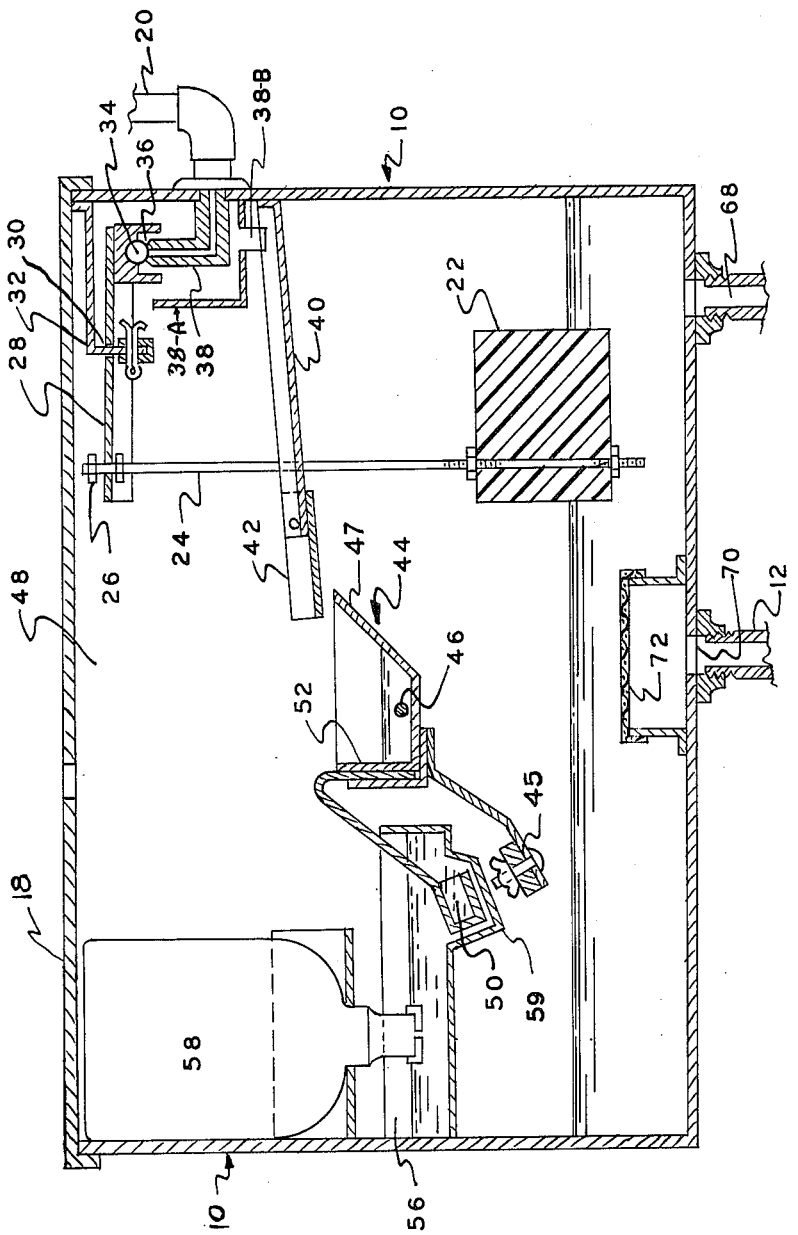
FIG. 3 is an enlarged sectional view looking in the direction of line 3—3 on FIG. 2, showing internal construction.

The main reservoir (FIG. 3)

Main reservoir 10 is supplied with water by a pipe 20 which leads from a source of water under pressure, such as a water main, not shown. The level of water in tank 10 is controlled by a float 22 at the lower end of rod 24, the upper end of which is connected, at 26, to one end of a lever 28 which is rockably mounted, as at 30, on a fixed pendent bracket 32. The other end of lever 28 carries a ball valve 34 which is adapted to engage a valve seat 36 formed at the inner end of fitting 38 which communicates with pipe 20. As can be readily seen, when float 22 rises, ball valve 34 engages seat 36 and stops the flow of water into reservoir 10, and vice versa. Below ball valve 34 and fitting 38 is a stationary gutter 40 which is preferably provided with a longitudinally adjustable tip 42 so as to overlie the adjacent end of a trip bucket 44. If desired, a compartment 38–A can be provided for receiving water from fitting 38 and for delivering the water through tube 38–B into gutter 40.

Figure 4:
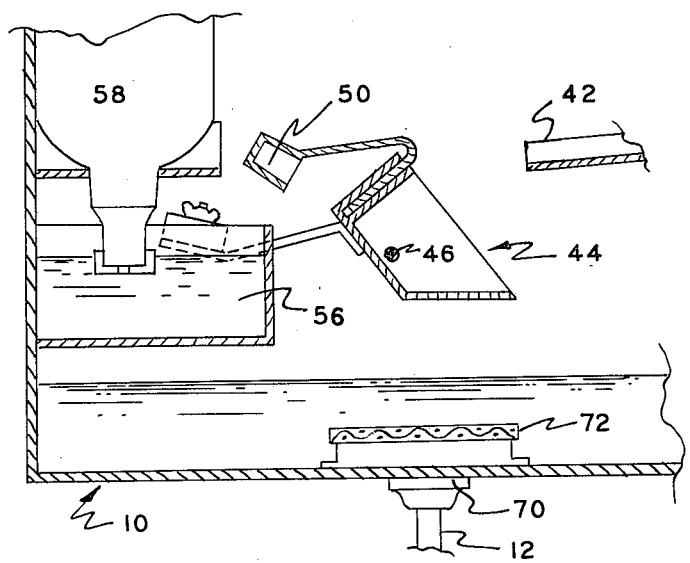
FIG. 4 is similar to the lower left hand corner of FIG. 3, but shows the manner in which medication is added to the drinking water.

Bucket 44 is pivoted, as at 46, to the side walls 48 of reservoir 10 and is provided with a weight 45. The location of pivot 46 relative to the center of gravity of bucket 44 is such that, when the bucket is empty, it assumes the horizontal position of FIG. 3, and so that, when it contains a predetermined amount of water, bucket 44 tips over in clockwise direction, and dumps its contents into reservoir 10, as shown in FIG. 4. In other words, the center of gravity of the bucket, when empty, is to the left of pivot 46. When a predetermined amount of water reaches the bucket, the center of gravity shifts to the right of pivot 46. By this arrangement, bucket 44 automatically reciprocates between the receiving and dumping positions of FIGS. 3 and 4. The calibration of the parts described is such that the amount of water dumped into reservoir 10 is enough, under normal conditions, to restore the level of the water in the reservoir to the point at which the flow of water into the tank is cut off thereby to maintain a substantially uniform static pressure. In other words, valve 34 will be opened whenever the level of the water in the reservoir falls below the desired level, and it will remain closed until it is again opened by downward movement of float 22.

The drinking water is preferably medicated, or treated with some additive, before reaching the drinking fountains. As shown in FIG. 3, a scoop 50 is secured to the left hand wall 52 of bucket 44 and is normally inverted, as shown in FIG. 3, so that, when bucket 44 tips, scoop 50 will be in the pouring or discharging position shown in FIG. 4. In the position of FIG. 3, scoop 50 is immersed in a liquid additive, such as medicines, vitamins, or the like, which are supplied to compartment 56 from an inverted bottle 58. It will be noted that scoop 50 discharges directly into reservoir 10. Optionally, compartment 56 is provided with a bottom sump 59, FIGS. 3 and 7.

Figure 7:
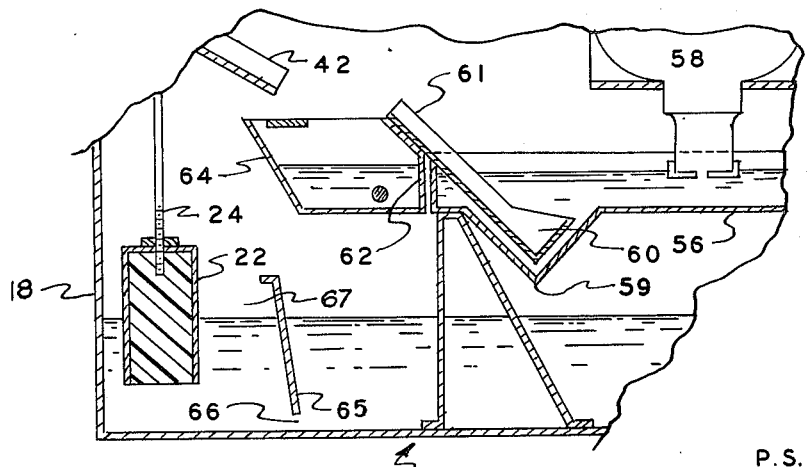
FIG. 7 is similar to FIG. 1, but showing a slightly different arrangement for adding a medicament to the drinking water.

In the embodiment illustrated in FIG. 7, scoop 60 is formed at the end of a gutter 61 wihch is secured directly to wall 62 of bucket 64 so that, when the bucket tips over, scoop 60 will empty into bucket 64 instead of into reservoir 10. This arrangement provides a more thorough mixing of the additives with water.

In the structure of FIG. 3, bucket 44 empties into reservoir 10, as shown in FIG.4. In the embodiment of FIG. 7, bucket 64 empties behind (to the left of) a partition 65 which extends across the entire width of reservoir 10, and the botom edge of which is spaced from the bottom of reservoir 10 to form a relatively narrow passage 66 through which the water and medicine discharged from bucket 64 must pass to reach that portion of the reservoir from which liquid is dispensed to the drinking fountains hereinafter described. The upper edge of partition 65 is above the normal level of liquid in reservoir 10 and serves as a stop to limit the tilting movement of trip bucket 64. In addition to insuring more thorough mixing of the water with the medicament, partition 65 provides a relatively small compartment 67 for receiving the contents of bucket 44. By this arrangement, the dumping of the bucket temporarily, but rapidly, raises the level of the water in this compartment above the level of water in the rest of the tank and raises float 22 to close valve 34 and stop the flow of water until the trip bucket rights itself.

Reservoir 10 is provided with a clean-out drain 68 and with a medicated water outlet fiting 70 which is connected to pipe 12 and is protected by a filter 72.

*The drinking fountain*

Since, except as hereinafter pointed out, the drinking fountains are identical in structure and operation, only the structure and operation of fountain 16, which is detailed in FIG. 6, will be described.

Figure 6:
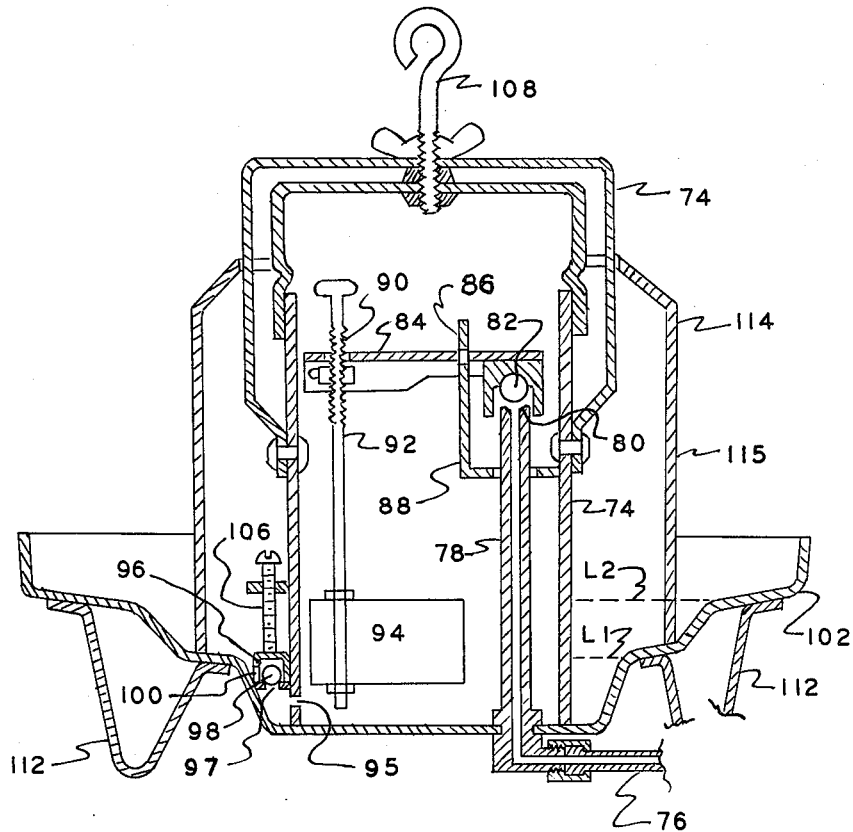
FIG. 6 is an enlarged sectional view looking in the direction of line 6—6 on FIG. 1.

As shown in FIG. 6, each fountain includes a tank 74 which is connected to pipe 12 by a small diameter, highly flexible tube 76 which is shown in FIG. 1. Flexible tube 76 leads to the lower end of a stand pipe 78, the upper end of which is provided with a valve seat 80 for receiving ball valve 82. Ball valve 82 is carried by one end of a lever 84 which is pivoted at 86 to a supporting bracket 88. The other end of lever 84 is adjustably connected, at 90, to the upper end of a rod 92, to the lower end of which is adjustably secured a float 94. The level of float 94 is adjusted to obtain the desired water level in tank 74 which, in turn, maintains the desired water level in trough 102. Structurally and functionally, the parts just described are the same as the corresponding parts in reservoir 10 in that, when float 94 falls to the predetermined level, ball valve 82 is unseated to admit water into the tank, and vice versa.

Tank 74 is provided with a bottom opening 95 through which water flows into a small compartment 96, the bottom wall of which is provided with an opening 97 which is adapted to be closed by ball valve 98. Compartment 96 is also provided with a lateral opening 100 through which water flows from compartment 96 into trough 102. The weight of ball valve 98 is so calibrated with respect to the area of opening 97 that, when the level of liquid in tank 74 rises to a predetermined level above opening 97, ball valve 98 will unseat and water will flow through openings 95, 97 and 100 into trough 102. When the water level in tank 74 falls to a predetermined level, ball valve 98 moves down and closes opening 97 in the bottom of compartment 96 to stop the flow of water into trough 102. This also prevents contaminated water from back-flowing out of trough 102 into tank 74, should the level of water in the tank fall and remain below the level in trough 102 due to failure of pressure in the main or otherwise. Float 94 is so adjusted as to maintain the level of the water in tank 74 at the desired level. The structure defining compartment 96 is preferably removably secured in position by screw 106 so that it may be removed for cleaning or repair.

As stated, fowl drink by immersing their beaks in the water and tilting their heads up. This causes water to drip on the floor and produces dirty and unsanitary conditions. This problem can be solved by raising the troughs above the ground or by keeping the level of water relatively low, as at L-1 in FIG. 6, thus compelling the fowl to stretch their necks so that any water dripping from their beaks will fall back into the trough before the heads of the fowl are withdrawn to a position outside the periphery of the trough. Because the fowl must reach into the bottom of the trough, they have to come close to the edge of the trough and therefore there is little, if any, chance for water dripping outside the trough when the fowl raise their heads to swallow. But, to make the same trough do for young fowl, it is necessary to raise the level of the water, as at L-2 in FIG. 6. This makes the water accessible, but it also makes it deep at the center so that a young chick hopping onto the edge of the trough and falling in may drown. In order to adapt the fountain for use by young and by full grown fowl, I have devised hood 114 which is best shown in FIG. 6. This hood has a top opening for the passage of the upper end of the tank, and has a cylindrical apron 115, the diameter of which is such as to enclose and render inaccessible the center or deep water area of the trough, approximately as shown in FIG. 6. In practice, hood 114 is used for young fowl having limited reach and as the fowl grow larger, the hood is either eliminated, or it may be replaced with another, the lower marginal portion of which could be recessed inwardly so as to have a smaller diameter. In that case, the water level will be lowered to a point between L-1 and L-2. In actual use, I have found that one hood suffices.

It will be noted that, if the level of water in the trough falls below opening 97, which is higher than opening 95, ball valve 98 will seat and will prevent back flow of contaminated water from the trough back into tank 74 and beyond. Also, it will be seen that the water pressure in reservoir 10 is a function of the head within the reservoir, and that the same is true of the pressure within tank 74, and that the pressure in both the reservoir and in associated tank 74 is relatively low and is substantially constant.

For use by large fowl, such as turkeys, the fountain can be suspended at uniform, or non-uniform, heights by means of hooks 108, which are engageable with a horizontal rod or chain, not shown, or the troughs can be mounted on pedestals 110 of the proper height (FIG. 1) or on relatively short supporting legs 112.

Figure 5:
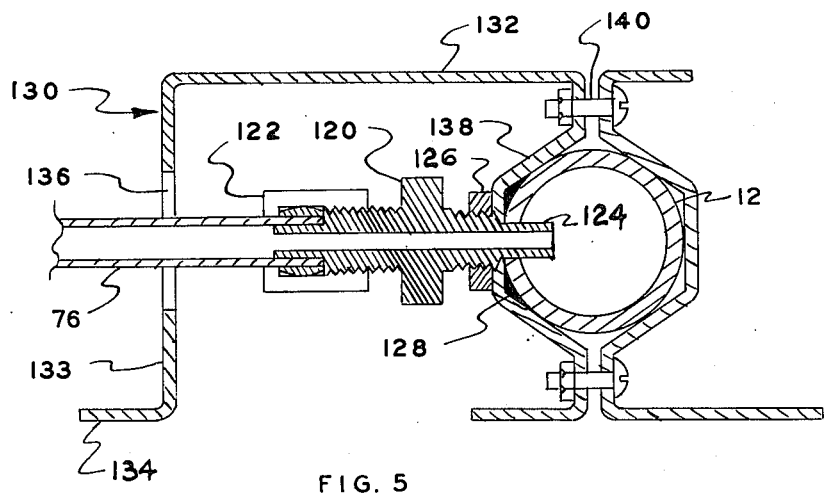
FIG. 5 is an enlarged sectional view looking in the direction of line 5—5 on FIG. 1.

The manner in which lateral tubes 76 are preferably connected to distribution pipe 12 is shown in FIG. 5, from which it will be seen that the end of tube 76 in inserted into slot formed in the outer end of a fitting 120 and is clamped by a binding nut 122. Fitting 120 is provided with a reduced end 124 which is inserted through a hole drilled in the side of pipe 12 and is clamped in position by a nut 126 engaging the threaded exterior of the fitting. Between nut 126 and pipe 12 is a soft gasket 128.

Flexible tubes 76 are of light construction and in a fowl breeding farm, they are subjected to more or less rough treatment by attendants and by animals. If unprotected, these tubes tend to crack at, or near the outer end of, fitting 120. In order to protect the tubes 76 and the adjacent fitting 120, I provide a shield 130 which includes a top wall 132, an outer side wall 133 and a bottom wall 134 which co-act to form a box-like structure which encloses the fitting and the adjacent end of tube 76 which emerges through an opening 136 in side wall 133. The inner side wall 138 is shaped to hug the side of pipe 12 to which it is secured by bolts 140 which also engage a similarly shaped clamping member 142. It will be noted that outer wall 133 of the shield is sufficiently spaced from pipe 12 so that if the portion of tube 76 beyond wall 133 is stepped on, or is otherwise strained, it can flex over a relatively large radius instead of rupturing, as may be the case if tube 76 formed a sharp angle with rigid fitting 120. It will also be noted that opening 136 is very much larger than the tube, thus allowing for free flexing of the tube. When the shield is used, its inner wall bears against gasket 128, as shown in FIG. 5.

In FIG. 5, I have shown a fitting 120 projecting from one side of pipe 12, but it will be understood that a fitting 120 may be applied to the opposite side of the pipe, in which case the structure shown at the left side of pipe 12 will be duplicated at the right side thereof so that pipe 12 can service a double row of fountains.

What I claim is:

1. Fowl watering apparatus comprising:
a tank having an inlet and an outlet,
a drinking fountain connected to said outlet,
a container within said tank holding additives for said water,
a first valve means for opening and closing said inlet to maintain a predetermined water level in said tank,
a second valve means for maintaining a predetermined water level in said fountain,
a bucket within said tank,
means mounting said bucket for tilting to a first position in which it receives water from said inlet and to a second position in which it empties into said tank,
said bucket being weighted so that, when empty, it assumes its first position, and so that it is tilted to its second position by the added weight of the water therein, and
a measuring scoop movable with said bucket,
said scoop in the first position of said bucket being positioned in said container so as to fill with additives and being movable out of said container by the movement of said bucket to its second position so as to transfer said additive into said tank.

2. Fowl watering apparatus comprising:
a tank having an inlet and an outlet,
a drinking fountain connected to said outlet,
a first valve for opening and closing said inlet to maintain a predetermined water level in said tank,
a second valve means for maintaining a predetermined water level in said fountain,
a bucket within said tank,
means mounting said bucket for tilting to a first position in which it receives water from said inlet and to a second position in which it empties into said tank,
said bucket being weighted so as to move to said first position when it is empty and so that it is moved to its second position by the added weight of water therein,
a container in said tank holding a water additive, and
a measuring scoop movable into said container when said bucket is in its first position so as to fill with additives, said scoop being movable out of said container as said bucket moves to its second position to transfer the additives into said bucket prior to the emptying thereof.

3. Fowl watering apparatus comprising:
a tank having an inlet and an outlet,
a drinking fountain connected to said outlet,
a first water level responsive valve means for maintaining a predetermined water level in said tank,
a second valve means for maintaining a predetermined water level in said fountain,
a partition dividing said tank into a first compartment associated with said first valve means,
and a second compartment associated with said outlet, there being a restricted passageway in a lower portion of said partition providing communication between said first and second compartments,
a bucket in said tank for receiving water from said inlet,
a container in said tank holding additives for the water, and
a measuring scoop positioned in said container to fill with additives when said bucket is positioned for receiving water from said outlet,
said bucket and said scoop being movable to a position to empty their contents into said first compartment rapidly to raise the level of the water in said first compartment to effect a quick closing response of said first valve prior to a uniform liquid level being established in said tank.

4. The structure recited in claim 2 in which said first compartment is smaller than said second compartment.

5. A fowl watering apparatus including a
a tank,
a water inlet and a water outlet,
a ball valve controlling said inlet,
a float for opening and closing said valve,
a gutter leading from said inlet,
a trip bucket adapted to receive water from said gutter,
means mounting said bucket for rotation about a horizontal axis to a first position in which it receives water from said gutter and to a second position in which it empties the water received from said gutter into the tank,
said bucket being weighted so that when empty, it assumes its first position and so that when it has received a predetermined amount of water from said gutter, it moves to its second position,
a water additive containing compartment adjacent to said bucket,
a scoop associated with said bucket and arranged to dip into said compartment when said bucket moves to its first position,
said scoop moving out of said compartment and emptying its additive contents into said tank as said bucket moves to its second position.

6. The structure recited in claim 5 in which said gutter is longitudinally adjustable.

7. A fowl watering system for use by large fowl and small fowl including:
a main tank having a water inlet and a water outlet,
a source of water under pressure connected to said inlet,
means for maintaining static hydraulic pressure in said tank, said means including
a bucket,
a gutter leading from said inlet to said bucket,
means mounting said bucket for rotation about a horizontal axis to a first position in which the bucket receives water from said gutter and to a second position in which said bucket empties into the tank,
and a fluid level responsive device for delivering a pre-determined amount of water to said gutter when the level of the water in the tank falls to a predetermined level,
a main conduit connected in flow relation with the outlet of said tank,
a plurality of individual drinking fountains,
flexible tubes connecting said fountains to said main conduit,
a water level responsive valve in each of said fountains for admitting water into said fountains short of the capacities thereof to produce bodies of water under further reduced static pressures, and
a reservoir containing a medicated liquid, and
a scoop movable with said bucket, said scoop being immersed in said liquid when said bucket is in its first position and being movable to empty its contents into said tank upon movement of said bucket to its second position to insure continuous uniform medication.

References Cited by the Examiner

UNITED STATES PATENTS

| | | | |
|---|---|---|---|
| 851,168 | 4/1907 | Hotze | 119—79 X |
| 2,671,464 | 3/1954 | Mabbs | 119—79 X |
| 3,063,417 | 11/1962 | Blosser | 119—79 |

FOREIGN PATENTS

| | | |
|---|---|---|
| 1,231,115 | 9/1960 | France. |
| 688,836 | 3/1953 | Great Britain. |

SAMUEL KOREN, *Primary Examiner.*

HUGH R. CHAMBLEE, *Examiner.*